3,650,968
FISHERMAN'S SOAP
Paul Hoffman, 1001 SW. 16th Ave, Gainesville, Fla. 32601, and John D. Hodge, Jr., 1505 Carr St., Palatka, Fla. 32077
No Drawing. Filed Apr. 30, 1968, Ser. No. 725,499
Int. Cl. C11d 7/08; C23g 1/02
U.S. Cl. 252—142           14 Claims

ABSTRACT OF THE DISCLOSURE

A cleaning composition for removing odors originating with fish, fish residue, fish slime and the like comprising a source of citric acid and a compatible detergent. The source of citric acid is preferably citrus fruits and the like, and the compatible detergent is preferably of the non-ionic type.

BACKGROUND OF THE INVENTION

Field of the invention

This invention relates to the control and removal of odors originating with fish, fish residues, fish slime and similar sources.

DESCRIPTION OF THE PRIOR ART

In the prior art, the removal of fish odors and the like has represented an ever-present problem. One approach has been to utilize chemical compounds, such as benzoic acid compounds, admixed with a detergent. This has not been completely satisfactory since benzoic acid is not readily available, and in large quantities could prove a danger to the user.

Citric acid has been used in cleaning compositions, but generally it has only been used as a pH controlling agent, and its value in the removal of fishy odors has never been realized. As a general rule, citric acid has been set out in the prior art cleaning compositions as only one of a series of acceptable acids, the only criticality involved being that the acid must result in a suitable hydrogen ion concentration. Applicant's invention resides in the discovery that the combination of a source of citric acid, such as citrus fruit juices in whole or in part, and a compatible detergent, results in a composition remarkably useful in removing fish odors.

The novel composition of this invention results in an esthetically pleasing combination of materials, extremely useful in removing the odor of fish, which is not harmful to the exterior tissues upon application. In addition, no dangerously toxic materials utilized, thereby resulting in an extremely safe composition.

SUMMARY OF THE INVENTION

It has been found that a combination of citrus fruit juices, in whole or in part, such as citric acid for example, and a compatible detergent, results in a composition remarkably efficient in removing the odor of fish, fish slime and the like. The compatible detergent is generally of the nonionic type, although any ionic detergent that is effective in the lower pH range would also be acceptable.

DESCRIPTION OF THE PREFERRED EMBODIMENTS

The odors originating from fish, fish slime and fish residue have long been a problem to fishermen and those who handle fish in the course of their occupation. The odors are extremely disagreeable to the average person, and extremely difficult to remove. In the past, strong chemicals or extreme mechanical abrasion have been utilized, often resulting in harm to the user.

The present invention comprises a source of citric acid, such as citric fruit juices in whole or in their parts, and a compatible detergent. It is preferred that the detergent be of the non-ionic type in an aqueous solution. Any detergent of this class of detergents is acceptable. In addition, an anionic or cationic detergent that is effective in the lower pH range is acceptable. This result is unexpected since ordinary soaps such as the standard commercial hand soaps or standard detergents will not remove fish odors. When combined with citrus fruit juices regular soaps or detergents such as are used in the household become ineffectual due to a neutralizing reaction with the fruit juices.

The efficiency of the combination of citrus fruit juices and a compatible detergent is surprising. This is due to the fact that a detergent, even of the non-ionic type, alone will remove only fish particles, while the odor remains. In addition, while citrus juices alone may obliterate the fish odor, they will not remove the particles of fish adhering to the article to be cleaned, allowing an additional source of unpleasant odor to remain.

In the present invention, any type of citrus juice is acceptable, lemon, orange and grapefruit citrus juices being representative of the general class. Concentrations many generally run from 0.1% to 15%. Suitable fish odor removing compositions can be formulated utilizing from 0.1% to 15% citrus juice with a non-ionic detergent in an aqueous solution. Of course, the average strength of a citrus juice will vary. However, this variation is generally not too great, and from 2%–15% of squeezed out lemon juice has been found to be preferred to formulating the cleaning composition of the instant invention. In general, the greater the amount of citrus juice present, the more effective the cleaning solution will be.

Citric acid has been utilized, and concentrations of 0.1%–5% have been used. The citric acid was utilized in solid form. Thus, the composition of the invention included from about 0.1 to 5 grams of citric acid per 100 grams of the final solution. Again, it was generally found that the higher the concentration of citric acid the more effective the detergent is. It will be appreciated that with respect to both citrus juices and citric acid, the exact concentrations may vary over a large range, the prime criteria being that no physiological harm results to the user. It will be obvious that stronger solutions than those described above will be more acceptable for inanimate objects.

As a general rule, the basic preferred form of the invention will include the following materials with the indicated proportions (all percentages being given in percent by weight).

|  | Percent |
|---|---|
| Water | 30–80 |
| Glycerin | 0–40 |
| Citrus juice | 0.1–15 |
| Detergent | 0.1–35 |

The proportion of detergent utilized in the composition of the invention throughout the specification is given in percent by weight. Thus, a particular formulation of the composition of the present invention containing 20% non-ionic detergent will contain 20 grams of non-ionic detergent per 100 grams of the composition. All the detergents described in the following examples were utilized in a 100% solution.

It will be understood that the general range of materials set out above represents the preferred range of materials, and, if desired, additional ingredients may be added. Of course, one skilled in the art, will, in view of the specific examples set out below, appreciate that the various process parameters must be varied to accommodate any additional materials which are added.

In general, the novel detergent which applicant has discovered may be formulated by merely mixing compatible liquids. There does not appear to be any great criticality involved in the order of mixing, but the following method which is described in the specific examples set out below has generally been utilized.

EXAMPLE 1

The necessary amount of detergent is poured into water which is maintained under general agitation. The water is heated, as necessary, to obtain a clear solution. Glycerin and any other minor ingredients may be added while the solution is still under agitation. If a thickener is required to obtain a more viscous solution, the temperature of the liquid must generally be raised and the speed of agitation must be increased. If a thickener has been added, the heat is reduced after the thickener is dissolved in the solution, and lemon juice is added under conditions of reduced agitation.

It will be understood, of course, that the order of material addition set out above is not critical, and any order selected may be utilized.

The final detergent thus contained:

20% non-ionic detergent
15% squeezed lemon juice
55% water
10% minor ingredients as needed (thickeners, anti-bacterial agents, skin conditioners and the like).

In the absence of minor ingredients, the water concentration is generally preferred to be about 65%, although from about 30% to about 80% water will be acceptable, depending upon the percentages of active ingredients present.

While this formula has been found to be effective for all the detergents and the juices utilized, one skilled in the art will appreciate that the optimum concentrations will vary depending upon the citrus juice and/or the citric acid concentration utilized and the exact detergent used.

EXAMPLE 2

The same procedural steps utilized in Example 1 were followed, and 10% glycerin was added as the thickener. The detergent thus formulated was found to be extremely effective in the removal of odors originating with fish, fish residue, fish slimes and the like. The detergent utilized was 20% Triton X-100, which is a non-ionic detergent manufactured and distributed by Rohm and Haas.

EXAMPLE 3

The process steps outlined in Example 1 were again utilized, giving a fisherman's soap having the following composition:

30% Triton X-100
15% lemon juice
1-10% lanolin cream
45% water
1-10% glycerin.

Both the glycerin and the lanolin cream concentrations were varied from 1 to 10%, and it was found that an acceptable soap resulted within these concentration ranges. The process parameter which was varied was the water concentration.

EXAMPLE 4

The process steps outlined in Example 1 were again utilized, giving a fisherman's soap having the following composition:

15% NOPCO 1179-R
48% water
30% glycerin
5% lemon juice
2% thickener.

It was found that by increasing the glycerin concentration, that the resultant formula was more acceptable upon topical use.

The formulation illustrated in Example 4 was found to be most preferred.

The following non-ionic detergents are representative of those acceptable:

NON-IONIC TYPES (1) Alkyl aryl polyether alcohols having the following general structural formula:

ALKYL ARYL POLYETHER

where X can vary from 1 to 30. Such a product is trade named Triton X-100 by Rohm & Haas Company, Philadelphia, Pa. Triton X-100 is isooctyl phenyl polyethoxy ethanol (OPE 9-10). Similar acceptable Triton-X detergents are Triton X-15, X-35, and X-45. Triton X-15 is octyl phenyl polyethoxy ethanol (OPE-1); Triton X-35 is octyl phenyl polyethoxy ethanol (OPE-3); and Triton X-45 is isooctyl phenyl polyethoxy ethanol (OPE-5).

(2) High molecular weight polyethylene glycol derivatives such as surfactants like AD 160, AD 400, AF 100, AR 150 manufactured by Hercules Powder Company, Wilmington, Del.

(3) Polyalkyl amides: These compounds would be utilized from 0.1% to 35%.

(4) Span, manufactured and distributed by the Atlas Powder Company, Wilmington, Del.

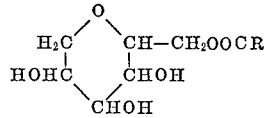

The Span materials are all sorbitans wherein R can be various fatty acid groups, e.g., monolaureate, monopalmitate, monostearate, monooleate.

(5) Tween, manufactured and distributed by the Atlas Powder Company, Wilmington, Del.

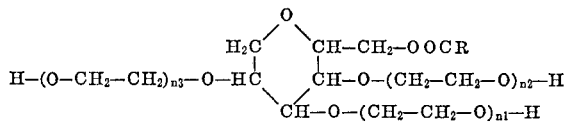

The Tween materials are all polyoxyethylene sorbitan mono-fatty acid materials, e.g., monolaurate, monopalmitate, monostearate, monooleate.

(6) Sterox AJ, manufactured and distributed by the Monsanto Chemical Company, St. Louis, Mo. Sterox AJ is a polyoxyethylene ether.

(7) Sterox CD, manufactured and distributed by the Monsanto Chemical Company, St. Louis, Mo. Sterox CD is a polyoxyethylene ether.

As the two Sterox compounds manufactured by Monsanto are proprietary materials, it is believed that no exact formulas are presently available for these compounds.

(8) Nopco 1179-R, manufactured by the Nopco Chemical Company, 60 Park Place, Newark, N.J.

As the Nopco compound manufactured by the Nopco Chemical Company is a proprietary material, it is believed that no exact formula is presently available for this composition.

Generally, any non-ionic, anionic or cationic detergent that retains its sudsing characteristics in the required pH range of 3.5-7.0 is acceptable. Usually, anionics form suds that are more "soap-like" while non-ionics wash "cleaner." It will be appreciated that any mixture of detergents can be utilized in the final product.

Non-ionic detergents similar to those listed above have generally been used in concentrations ranging from 1% to 35% in the final solution. Optimum concentration was found to be in the general area of 15% to 20%.

Anionic detergents which have been found to be acceptable are the sulphated or sulphonated alkyl aryl compounds.

Specific examples of anionic detergents which have been found acceptable are:

Triton GR–5, manufactured and distributed by the Rohm and Haas Company, Philadelphia, Pa. (this is basically a sulphonated alkyl ester).

Tergitol 4 and Tergitol 7, manufactured and distributed by Union Carbide Chemical Co.

G–263, G–271 and G–3300, all manufactured and distributed by the Atlas Powder Company, Wilmington, Del.

The anionic detergents similar to those listed above have generally been used in concentrations ranging from 1% to 35% in the final solution. Optimum concentration was found to be in the general area of 15%. Of course, as the detergent concentration varies, the remaining concentrations in the soap can be varied accordingly in view of the specific examples set out above.

Any of the above compositions are remarkably efficient in removing the odor of fish, fish slimes, and fish residues. These compositions can be formulated with other compatible conventional additives such as lanolin or glycerin for skin conditioning and various anti-bacterial or deodorizing agents for sanitizing purposes.

Generally, lanolin may be incorporated into the composition of the present invention in amounts ranging from 1% to 10% by weight.

Glycerin may be incorporated into the composition of the present invention in amounts ranging from 0 to 40% by weight. It was generally found that a more pleasing product resulted with increased glycerin concentration.

Any compatible anti-bacterial agents may be utilized, specific examples being Hyamine 1622, Hyamine 10–X and Hyamine 2389. These anti-bacterial agents are manufactured by the Rohm and Haas Company. Generally, the anti-bacterial agents may be incorporated into applicant's composition in any of the formulas described at levels of from 0–1%. The exact percentage is not critical, it being understood that effectiveness will generally increase with higher concentrations of the anti-bacterial agent utilized.

If desired, abrasive materials such as silica, calcium phosphate and melamine-formaldehyde resins may be incorporated into the instant composition. It will be appreciated that the abrasives will most optimumly be added when the composition is in the form of a cream or bar soap.

When formulated in bar form, any commercial base formulation may be utilized. It is preferred that the soap base, if a bar form is used, be a solid non-ionic material or zinc stearate, palmitate or other insoluble soap. Moisture formulation would optimumly be from about 10–15% by weight.

In addition, although the novel composition of this invention finds especially valuable use in removing the odor of fish from the human body, it could also be utilized to remove fish odor from clothing as a laundry product, utensils as a dishwashing product, and tackle boxes in an all-purpose detergent. As stated, where usage is contemplated for some reason other than as a hand soap or the like, concentrations of the active ingredients may generally be increased. The exact amounts will, of course, depend on the usage contemplated. Thus, it will be obvious that a stronger material could be utilized to clean a tackle box than one used as a laundry product.

The solution can be impregnated into suitable substrates such as cloth, paper, sponge and the like. It will be appreciated that any standard method of impregnating a porous substrate may be utilized. For instance, if a paper or cloth substrate is contemplated, the substrate may merely be dipped into the soap solution. Excess material could be removed from the substrate by pressing through a set of rubber rolls, or the like. Generally, excess water should be removed by drying in a moderately heated oven. If a continuous process is contemplated, the paper, cloth or the like, could be continuously passed through a saturating bath and squeeze rolls. The web may then be dried in an oven with high velocity air or the like. The porous substrate material could also be incorporated directly into the composition, if desired.

The amazing versatility of the composition is due to the fact that the invention resides primarily in the combination of a source of citric acid and a compatible detergent. Therefore, any of the conventional means of applying a detergent composition as illustrated above may be utilized. The composition of this invention is easily adapted to standard processing steps resulting in both solid and liquid forms.

It will be appreciated that the novel composition of applicant's invention may be utilized as a spray or a foam. The only requirement for utilization in spray form is that the viscosity be low enough to be handled in standard dispensing equipment. If a foam is utilized, any propellant which is compatible with the composition is acceptable. Since the propellant compositions normally utilized in forming foams are inert, there will be no problem of compatibility in this respect. Since the solution is relatively mild, the container material will not be harmed.

It will be appreciated, of course, that other solvent bases will be acceptable besides water. However, due to its ready availability and cost, water has been discussed throughout the examples. Generally, if some other solvent base besides water is utilized, it will be necessary that this base be compatible with the materials utilized in the composition, and, if usage as a hand cleanser is contemplated, that the solvent base not be detrimental to the skin.

Coloring agents and perfumes may be incorporated in the soap of the instant invention if desired. However, these will not be necessary and will only be added for some esthetic purpose if desired.

It is to be understood that the term "minor ingredients" includes all the materials discussed which may be added to the cleaning composition to improve the quality thereof. It will be within the scope of one skilled in the art to determine the exact proportions utilized, since this will vary as to the exact use contemplated.

Although the invention has been described with reference to only a few examples, it is to be understood that variations thereof may be developed without departing from its spirit or scope.

What is claimed is:

1. An aqueous composition for removing fishy odors and the like consisting essentially of a source of citric acid which is a member selected from the group consisting of from 0.1 to 5.0 grams, per 100 grams of said composition, of solid citric acid, and from 0.1 to 15% by weight of a citrus juice, from about 0.1 to about 35% by weight of a compatible detergent selected from the group consisting of non-ionic detergents and anionic detergents, effective in an acidic pH range, from about 30 to about 80% water, and from 0 to about 40% by weight glycerin.

2. A composition as in claim 1 wherein the source of citric acid is at least one citrus juice.

3. A composition as in claim 1 wherein an aqueous solution of a non-ionic detergent is utilized.

4. A composition as in claim 3 wherein said aqueous solution of non-ionic detergent comprises from about 1 to about 35% by weight of the final solution.

5. A composition as in claim 1 wherein an aqueous solution of said anionic detergent is utilized.

6. A composition as in claim 1 wherein said composition further includes at least one member selected from the group consisting of lanolin and glycerin.

7. A composition as in claim 1 which comprises from about 30 to about 80% by weight water, from about 0 to about 40% by weight glycerin, from about 0.1 to about 15% by weight citrus juice and from about 0.1 to about 35% by weight of a non-ionic detergent.

8. A composition as in claim 1 which comprises about 15% by weight non-ionic detergent, about 48% by weight water, about 30% by weight glycerin, and about 5% by weight lemon juice.

9. The composition of claim 6 wherein said composition includes from 1 to 10% of said one member selected from said group.

10. The composition of claim 1 wherein said source of citric acid is from 0.1 to 15% of a citrus juice selected from the group consisting of lemon juice, orange juice and grapefruit juice, and from 15 to 20% of said non-ionic detergent is present, the balance of said composition being water, said composition having a pH within the range of from 3.5 to 7.0.

11. The composition of claim 1 wherein said source of citric acid is from 2 to 15% of lemon juice.

12. The composition of claim 1 wherein said source of citric acid is from 0.1 to 5 grams of solid citric acid per 100 grams of said composition.

13. The composition of claim 1 wherein said proportions are such that said composition is not harmful to exterior human tissue upon application thereto.

14. The composition of claim 1 which has a pH of 3.5 to 7.0.

References Cited
UNITED STATES PATENTS

| | | | |
|---|---|---|---|
| 3,042,621 | 7/1962 | Kirschenbauer | 252—142 |
| 3,113,104 | 12/1963 | Bersworth | 252—132 |
| 3,141,821 | 7/1964 | Compeau | 424—76 |
| 3,179,596 | 4/1965 | Farrar et al. | 252—132 |
| 3,459,561 | 8/1969 | Mook et al. | 99—111 |

FOREIGN PATENTS

| | | | |
|---|---|---|---|
| 18,247 | 1903 | Great Britain | 252—132 |

LEON D. ROSDOL, Primary Examiner

W. E. SCHULZ, Assistant Examiner

U.S. Cl. X.R.

252—89; 424—76